US012347283B1

United States Patent
Mattison et al.

(10) Patent No.: US 12,347,283 B1
(45) Date of Patent: Jul. 1, 2025

(54) GENERATIVE ARTIFICIAL INTELLIGENCE-BASED AUTOMATED TELLER MACHINE PROCESS GENERATION

(71) Applicant: Bank of America Corporation, Charlotte, NC (US)

(72) Inventors: Paul Mattison, Charlotte, NC (US); Matthew Williams, Plano, TX (US); Jennifer Raley, Mount Holly, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/654,126

(22) Filed: May 3, 2024

(51) Int. Cl.
G07F 19/00 (2006.01)
(52) U.S. Cl.
CPC .................. G07F 19/201 (2013.01)
(58) Field of Classification Search
CPC ...................................... G07F 19/201
USPC ....................................... 235/379
See application file for complete search history.

(56) References Cited

U.S. PATENT DOCUMENTS

| | | | |
|---|---|---|---|
| 10,380,788 B2 | 8/2019 | Martinez | |
| 10,789,755 B2 | 9/2020 | Amer et al. | |
| 11,042,800 B2 | 6/2021 | Mars et al. | |
| 11,164,581 B2 | 11/2021 | Chae et al. | |
| 11,429,712 B2 | 8/2022 | Ortiz et al. | |
| 11,521,273 B2 | 12/2022 | Jakka et al. | |
| 2019/0033849 A1 | 1/2019 | Cella et al. | |
| 2019/0095775 A1 | 3/2019 | Lembersky et al. | |

OTHER PUBLICATIONS

Dec. 19, 2024—(US) Non-Final Office Action—U.S. Appl. No. 18/654,188.
Apr. 10, 2025—(US) Notice of Allowance—U.S. Appl. No. 18/654,188.

*Primary Examiner* — Daniel A Hess
(74) *Attorney, Agent, or Firm* — Banner & Witcoff, Ltd.

(57) ABSTRACT

Arrangements for using generative artificial intelligence models for ATM process generation are provided. In some examples, a computing platform may receive, from at least one image or measurement capture device, dimension data associated with an ATM. The ATM may have a plurality of components arranged on a face of the ATM. The dimension data may be input to a generative artificial intelligence model and the model may be executed to output, based on the dimension data, a position or location of each ATM component relative to a reference point on the ATM. In some examples, the model may further output at least one audio script describing the location of each component. The model may output one or more translations of the at least one audio script. The computing platform may transmit or send the at least one audio script to the ATM for presentation during user interaction with the ATM.

20 Claims, 14 Drawing Sheets

GENERATIVE ARTIFICIAL INTELLIGENCE-BASED AUTOMATED TELLER MACHINE PROCESS GENERATION

BACKGROUND

Aspects of the disclosure relate to electrical computers, systems, and devices for artificial intelligence-based automated teller machine (ATM) process generation.

Currently, ATMs have a plurality of manual processes to measure overall dimensions of an ATM, determine a position of each component with respect to a reference point on the ATM, and the like. The measurements are then used to generate audio scripts to describe the position of components for use by, for instance, visually impaired users who access audio functionality of the ATM via the headphone jack of the ATM. However, this process can be inaccurate and time-consuming. Further, conventional arrangements require coding, developing, testing, and the like ATM functions twice, once for sighted users (e.g., user interfaces, and the like) and once for visually impaired users (e.g., audio scripts or data are used to audibly describe all aspects and functions provided via the user interfaces for sighted users). These issues can be further compounded if the processes generated do not meet regulatory requirements for position of components, audio data, and the like.

Further, current systems are limited in a number of languages in which information is provided via the ATM. For instance, the ATM may have options to provide user interfaces or audio data in more than one language but still far less than all languages needed. In addition, current systems to not provide for options or variations in language due to different dialects.

Accordingly, aspects described herein include a generative artificial intelligence-based system for generating one or more ATM processes that meet regulatory requirements and provide an enhanced customer experience by enabling dynamic generation of visual and audio data in a plurality of languages.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated using accurately generating ATM processes.

In some examples, a computing platform may receive, from at least one image or measurement capture device, dimension data associated with an ATM. In some examples, the ATM may have a plurality of components arranged on a face of the ATM. The dimension data may be input to a generative artificial intelligence model and the model may be executed to output, based on the dimension data, a position or location of each ATM component on a face or surface of the ATM relative to a reference point on the ATM. In some examples, the model may further output at least one audio script describing the location of each component of the plurality of components. In some examples, the model may output one or more translations of the at least one audio script translating the audio script into a plurality of other languages. The computing platform may transmit or send the at least one audio script to the ATM for presentation to a user during user interaction with the ATM.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, ATM functionality is often thought of as merely displays of user interfaces. However, for visually impaired users, all functionality must be audibly presented or read out to the user. This process may be initiated upon a user inserting a headphone into the headphone jack of the ATM. However, this process may be limited in a number of languages in which the data is presented and may also rely on potentially inaccurate measurements of components of the ATM that are used to generate the scripts describing position or location of the component on the face of the ATM.

Accordingly, aspects described herein enable use of generative artificial intelligence to analyze dimensions of an ATM, determine position of various components and output an audio script describing the position, providing a description of available functionality, and the like. For instance, image or measurement data may be analyzed using a generative AI model that may output the position of each component, as well as one or more audio scripts describing the position of each component, describing functionality of the ATM and options available for selection, and the like.

In addition, aspects described herein may enable use of generative artificial intelligence to generate outputs (e.g., user interfaces, audio scripts, and the like) in a plurality of languages to accommodate speakers of various languages. In some examples, the generative artificial intelligence model may detect a preferred language of the user, as well as a dialect, and generate one or more outputs in the preferred language.

These and various other arrangements will be discussed more fully below.

Figure 1A:
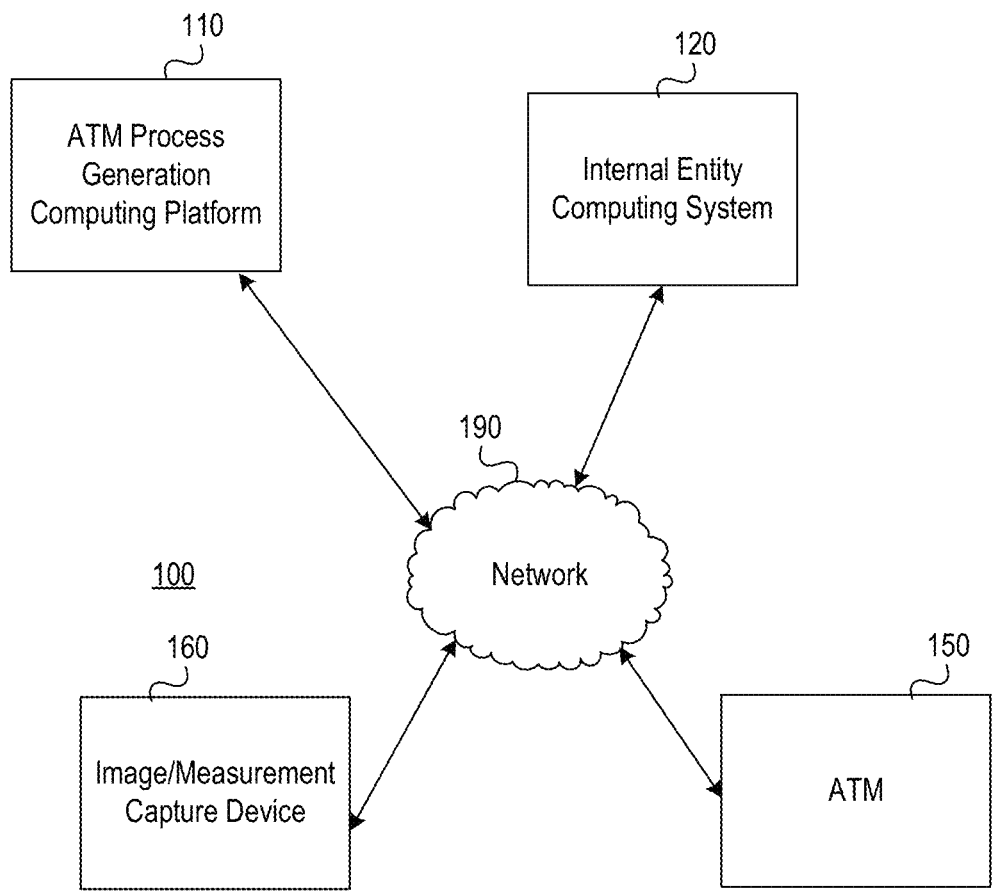
FIGS. 1A-1B depict an illustrative computing environment for using generative artificial intelligence models to generate ATM processes in accordance with one or more aspects described herein.
Figure 1B:
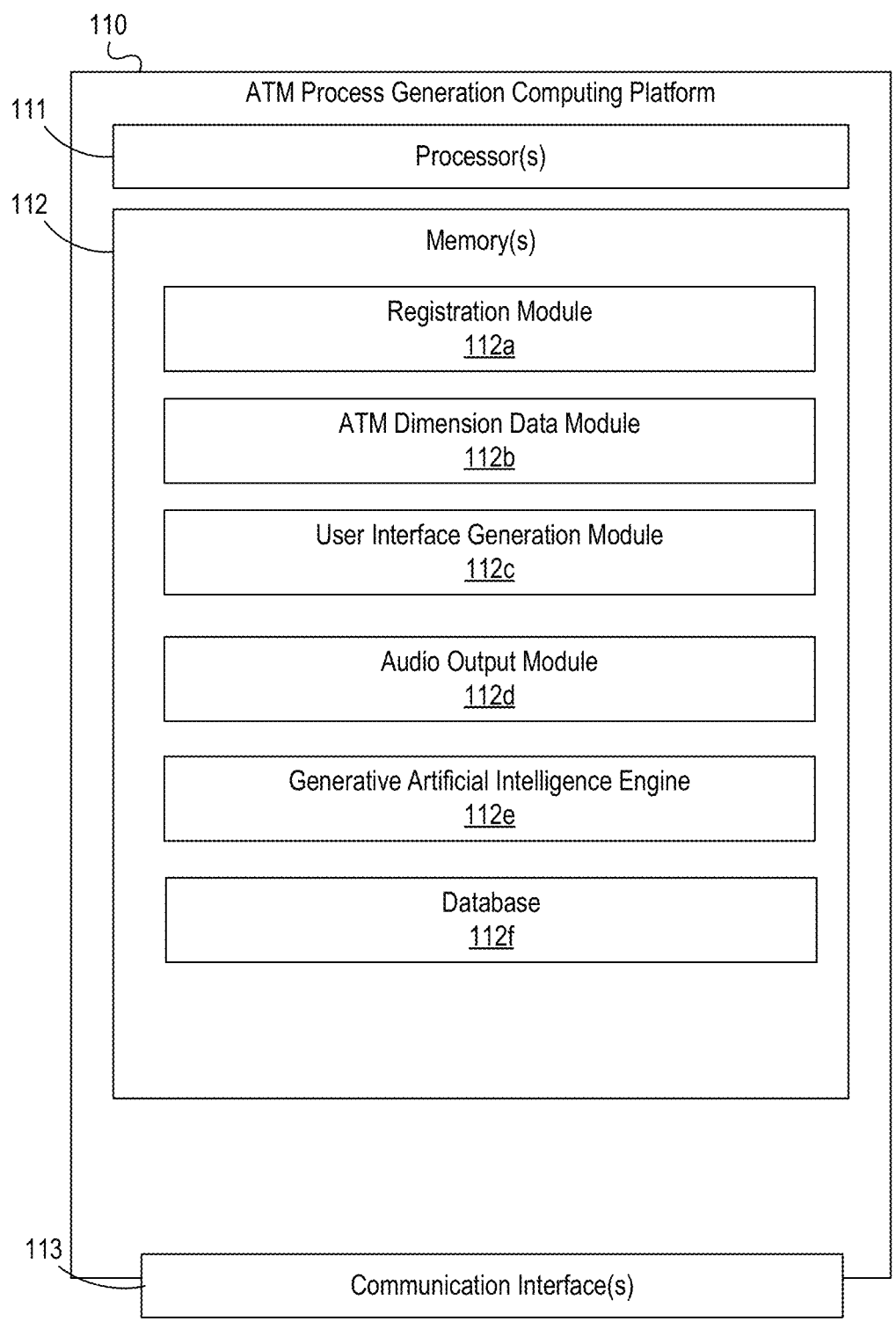

FIGS. 1A-1B depict an illustrative computing environment for using generative artificial intelligence to generate automated teller machine (ATM) processes in accordance with one or more aspects described herein. Referring to FIG. 1A, computing environment 100 may include one or more computing devices and/or other computing systems. For example, computing environment 100 may include ATM process generation computing platform 110, internal entity computing system 120, ATM 150 and image/measurement capture device 160. Although one internal entity computing system 120, one ATM 150 and one image/measurement capture device 160 are shown, any number of devices or systems may be used without departing from the invention. Further, image/measurement capture device 160 may be or include one or more different types of image/measurement devices, as will be discussed more fully herein.

ATM process generation computing platform 110 may be or include one or more computing devices (e.g., servers, server blades, or the like) and/or one or more computing components (e.g., memory, processor, and the like) and may be configured to provide dynamic, efficient, intelligent ATM process generation functions. For instance, ATM process generation computing platform 110 may receive image and/or measurement data associated with an ATM. For instance, image and/or measurement data may include overall dimensions of the ATM, position of one or more components of the ATM relative to a reference point, or the like. The ATM process generation computing platform may execute a generative artificial intelligence (AI) model using the image and/or measurement data as inputs to output a validation that the components of the ATM meet regulatory requirements. Further, the AI model may generate or output position description data of the one or more components of the ATM relative to the reference point (e.g., position of the card reader, cash dispensing slot, receipt dispensing slot, or the like, relative to a reference point, such as a number "5" on a keypad of the ATM, or the like). The AI model may further output an audio script describing a position of each component, as well as translations of the audio script, for use when visually impaired users access the ATM and insert a headphone into the headphone jack (e.g., to prompt audio functionality of the ATM).

In some examples, ATM process generation computing platform 110 may host or execute a plurality of nested generative AI models. The plurality of nested AI models may each be associated with a different type of functionality (e.g., deposits, general inquiries, transfer, or the like). The ATM process generation computing platform 110 may detect or retrieve a preferred language for a user and may generate user interfaces, audio scripts, or the like, based on the nested AI models and in the preferred language of the user. In some examples, the preferred language may include a particular dialect of the language. The user interfaces may further be dynamically generated to modify a size, position, color, contrast, or the like, of text to accommodate the preferred language of the user.

Internal entity computing system 120 may be or include one or more computing devices (e.g., servers, server blades, or the like) and/or one or more computing components (e.g., memory, processor, and the like) and may be configured to host or execute one or more enterprise organization applications, systems or the like. For instance, internal entity computing system 120 may host applications associated with processing transactions, authenticating a user, providing access to user data, updating or modifying an account ledger based on executed transactions, and the like.

ATM 150 may be or include one or more computing or devices (e.g., servers, server blades, or the like) and/or one or more computing components (e.g., memory, processor, and the like) and may be configured to receive an indication of a request from a user (e.g., card reader initiation of transaction), display one or more user interfaces, provide audio output, receive user input via one or more input devices (e.g., touchscreen, keypad, or the like), receive audio user input, process transactions (e.g., receive deposits, dispense funds, or the like), and the like.

Image/measurement capture device 160 may be or include one or more cameras, laser measurement tools, or the like, configured to capture image and/or measurement data associated with an ATM. The image/measurement capture device 160 may be configured to capture overall dimension data, position data associated with components of the ATM relative to a reference point, light availability or sufficiency in an area, or the like.

As mentioned above, computing environment 100 also may include one or more networks, which may interconnect one or more of ATM process generation computing platform 110, internal entity computing system 120, ATM 150 and/or image/measurement capture device 160. For example, computing environment 100 may include network 190. Network 190 may include one or more sub-networks (e.g., Local Area Networks (LANs), Wide Area Networks (WANs), or the like). Network 190 may be associated with a particular organization (e.g., a corporation, financial institution, educational institution, governmental institution, or the like) and may interconnect one or more computing devices associated with the organization. For example, ATM process generation computing platform 110, internal entity computing system 120, ATM 150 and/or image/measurement capture device 160 may be associated with an enterprise organization (e.g., a financial institution), and network 190 may be associated with and/or operated by the organization, and may include one or more networks (e.g., LANs, WANs, virtual private networks (VPNs), or the like) that interconnect ATM process generation computing platform 110, internal entity computing system 120, ATM 150 and/or image/measurement capture device 160 and one or more other computing devices and/or computer systems that are used by, operated by, and/or otherwise associated with the organization.

Referring to FIG. 1B, ATM process generation computing platform 110 may include one or more processors 111, memory 112, and communication interface 113. A data bus may interconnect processor(s) 111, memory 112, and communication interface 113. Communication interface 113 may be a network interface configured to support communication between ATM process generation computing platform 110 and one or more networks (e.g., network 190, or the like). Memory 112 may include one or more program modules having instructions that when executed by processor(s) 111 cause ATM process generation computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of ATM process generation computing platform 110 and/or by different computing devices that may form and/or otherwise make up ATM process generation computing platform 110.

For example, memory 112 may have, store and/or include registration module 112a. Registration module 112a may store instructions and/or data that may cause or enable the ATM process generation computing platform 110 to receive registration data associated with one or more ATMs. The registration may include a make, model number, expected location of deployment, and the like. This information may then be used in analyzing the dimensions of the ATM to ensure compliance with regulator requirements related to ATM position, use, and the like.

ATM process generation computing platform 110 may further have, store and/or include ATM dimension data module 112b. ATM dimension data module 112b may store instructions and/or data to cause or enable the ATM process generation computing platform 110 to receive, from one or more image/measurement capture devices 160, image and/or measurement data. The image and/or measurement data may be captured via camera, laser measuring tools, or the like and may include overall dimension data of the ATM, position data of one or more components of the ATM relative to a reference point, or the like. In some examples, the data may be formatted for further analysis processing (e.g., by generative AI model).

ATM process generation computing platform 110 may further have, store and/or include user interface generation module 112c. User interface generation module 112c may store instructions and/or data that may cause or enable the ATM process generation computing platform 110 to generate, based on outputs of the generative AI engine, one or more user interfaces in one or more preferred languages or dialects of a particular user, or the like.

ATM process generation computing platform 110 may further have, store and/or include audio output module 112d. Audio output module 112d may store instructions and/or data that may cause or enable the ATM process generation computing platform 110 to generate one or more audio scripts or outputs for presentation to, for instance, visually impaired user. The audio outputs or scripts may be translated into one or more languages and may provide details information related to a position of various components of the ATM relative to a reference point.

ATM process generation computing platform 110 may further have, store and/or include generative artificial intelligence engine 112e. Generative AI engine 112e may host, train, execute, update and/or validate one or more generative AI models that may receive inputs such as image and/or measurement data of an ATM, user requests for transactions or other user input, or the like, and, upon execution of the one or more models, may output audio script data describing a position of components of the ATM, user interface or audio data in a preferred language or dialect of a user to facilitate transaction processing, and the like. In some examples, generative AI engine 112e may host, train, execute, validate and/or update a plurality of nested generative AI models, wherein each model of the nested generative AI models may correspond to a different type of functionality of the ATM (e.g., deposits, transfers, inquiries, or the like). The use of nested models may reduce processing required to train, update, validate and/or execute models by isolating a nested model particular to a topic and executing, updating, or the like, that nested model, which may, e.g., be more manageable than updating a single model having all functionality.

The AI model(s) may be trained using previously captured and/or historical ATM data (e.g., dimension data, user interface data, audio data, functionality data, language or dialect data, or the like). In some examples, additional data, such as regulatory requirements, publicly available data, or the like, may be used to train the one or more AI models. For instance, the AI model(s) may be trained using previous dimension data and regulatory requirements to identify patterns, sequences or correlations to validate that the ATM meets regulatory requirements and generate audio scripts or outputs describing a position of various components. In another example, the one or more AI models may be trained using historical functionality data (e.g., user interfaces presented, audio data presented, and the like) to identify patterns, sequences and/or correlations, to generate, in real-time and based on user input, one or more user interfaces, audio scripts or the like, in a preferred language and/or dialect detected from user interaction or retrieved from previous interactions. For instance, foundational knowledge related to ATM, ATM processes and functionality, and the like, may be used in conjunction with generative aspects, to provide real-time, dynamic generation of user interfaces, audio outputs, and the like, to enhance the customer experience.

In some examples, the AI model may be or include generative adversarial networks, diffusion models, variational autoencoders, flow models, and the like. Various other models, such as one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models may be used without departing from the invention.

ATM process generation computing platform 110 may include database 112f. Database 112f may store data related to ATM dimensions, ATM functionality, language preferences, and/or other data that enables performance of aspects described herein by the ATM process generation computing platform 110.

FIGS. 2A-2H depict one example illustrative event sequence for using generative artificial intelligence to generate and deploy ATM processes and functions in accordance with one or more aspects described herein. The events shown in the illustrative event sequence are merely one example sequence and additional events may be added, or events may be omitted, without departing from the invention. Further, one or more processes discussed with respect to FIGS. 2A-2H may be performed in real-time or near real-time.

Figure 2A:
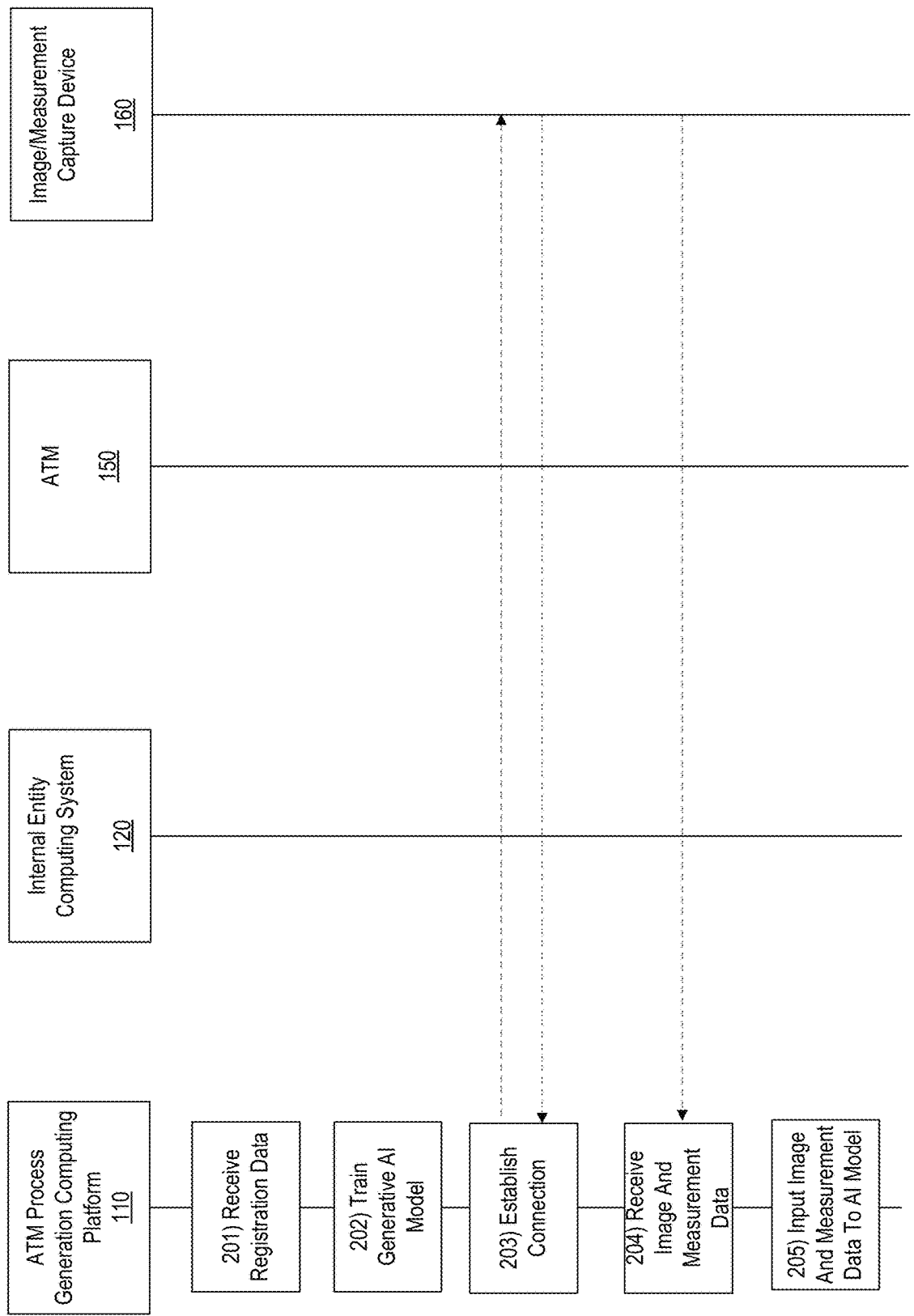
FIGS. 2A-2H depict an illustrative event sequence for using generative artificial intelligence models to generate ATM processes in accordance with one or more aspects described herein.

With reference to FIG. 2A, at step 201, ATM process generation computing platform 110 may receive registration data. For instance, data associated with a plurality of ATMs may be received by ATM process generation computing platform 110 and stored in database 112f. The registration data may include a make or manufacturer of the ATM, model number, deployment location, unique identifier associated with the ATM, or the like.

At step 202, ATM process generation computing platform 110 may train one or more generative AI models. For instance, historical data related to dimensions, positions of components relative to a reference point, user interfaces, functionality, audio scripts, language data, regulatory data, and the like may be used to train a generative AI model to recognize patterns, sequences, correlations, and the like (e.g., structure-activity relationships) and generate content based on those recognized patterns, sequences or correlations. In some examples, ATM process generation computing platform may train one or more AI models to receive, as inputs, measurement and/or image data to output overall dimension data of an ATM, position of components relative to a reference point, as well as audio script data describing a position of each component relative to the reference point. In some examples, the audio script data may be translated, by the AI model, into a plurality of languages, dialects, and the like.

In some examples, a plurality of nested AI models may be generated. Each nested AI model may correspond to different functionality of an ATM (e.g., deposits, inquiries, or the like). Accordingly, the nested models may work alone or in conjunction with an additional AI model (e.g., foundational model) to receive user input and, in response, recognize language preferences of the user (e.g., language, dialect, or the like) and generate, in real-time or near real-time, user interfaces, audio output, and the like, to provide functionality to the user in the preferred language.

At step 203, ATM process generation computing platform 110 may establish a connection with image/measurement capture device 160. For instance, ATM process generation computing platform 110 may establish a first wireless connection with image/measurement capture device 160. Upon establishing the first wireless connection, a communication session may be initiated between ATM process generation computing platform 110 and image/measurement capture device 160.

At step 204, the ATM process generation computing platform 110 may receive image and/or measurement data from the image/measurement capture device 160. For instance, image/measurement capture device 160 may be or include one or more cameras, laser measuring tools, or the like, that may capture data associated with an overall dimension of the ATM, measurements of components of the ATM (e.g., position of card reader, receipt dispensing slot, cash dispensing slot, keypad, or the like, on a face of the ATM, or the like).

At step 205, the received image and/or measurement data may be input to the one or more generative AI models.

Figure 2B:
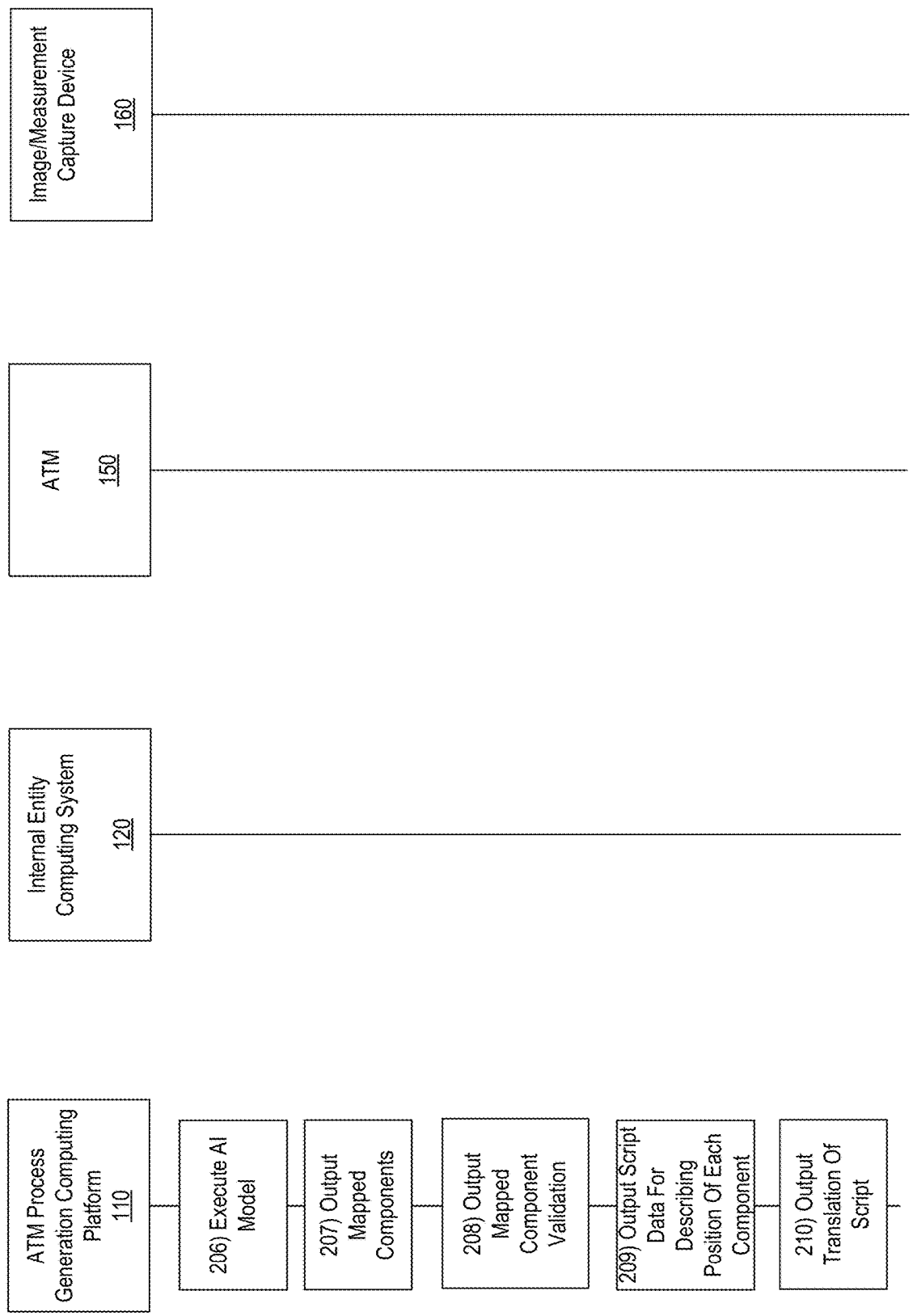

With reference to FIG. 2B, at step 206, the ATM process generation computing platform 110 may execute the one or more AI models using the inputs provided at step 205. For instance, the image and/or measurement data may be input to the AI model and the model may be executed to identify the overall dimension data, position of components, and the like.

Based on analysis of this data, the AI model may output, at step 207, mapping of the hardware and/or components of the ATM. For instance, overall dimension data may be output along with precise position data of the one or more components of the ATM on a face of the ATM (e.g., position of the card reader, deposit slot, cash dispensing slot, receipt dispensing slot, headphone jack, and the like). The mapping may include descriptions of a position of each component relative to a reference point. For instance, a reference point may be a number "5" on a keypad of the ATM (which may, e.g., approximate a center point of the face of the ATM) and each component may be identified by a position relative to the number "5" key and generated by the AI model. In some examples, the positions may be output using a face of a clock as a reference. Accordingly, if a receipt dispensing slot is in an upper right corner of the ATM, the AI model may output a position as "11 o'clock and three inches from the number "5" key on the keypad." In another example, a cash dispensing slot may be positioned directly below the keypad and, accordingly, the AI model may output the position as "6 o'clock and 2 inches from the number "5" key on the keypad." Various other examples, may be used without departing from the invention.

At step 208, the AI model may evaluate the output component mappings to ensure they comply with regulatory requirements. For instance, training data related to regulatory requirements for size, position, description, and the like, of various components of the ATM may be used to train the AI model and the model may then evaluate the output mappings to ensure the ATM is in compliance with all requirements. If not, a notification may be transmitted to a user device indicating the potential issue. If so, the process may continue.

At step 209, the ATM process generation computing platform 110 (e.g., via the AI model) may output, based on the analysis of the input data and generated component mappings, one or more audio scripts providing audio indications of locations of the components relative to the reference point. In some examples, the scripts may be generated to include additional audio data welcoming the user, requesting the user to identify the desired function or transaction, confirming an amount of the transaction, or the like. Accordingly, one or more scripts to guide, for instance, visually impaired user through the process of using the ATM to perform one or more functions may be generated by the AI model.

At step 210, the AI model may output one or more translations of the one or more generated audio scripts into a plurality of languages. For instance, based on language and/or dialect data used to train the AI model, the model may generate translations of each script to provide similar assistance to visually impaired users in a variety of languages.

Figure 2C:
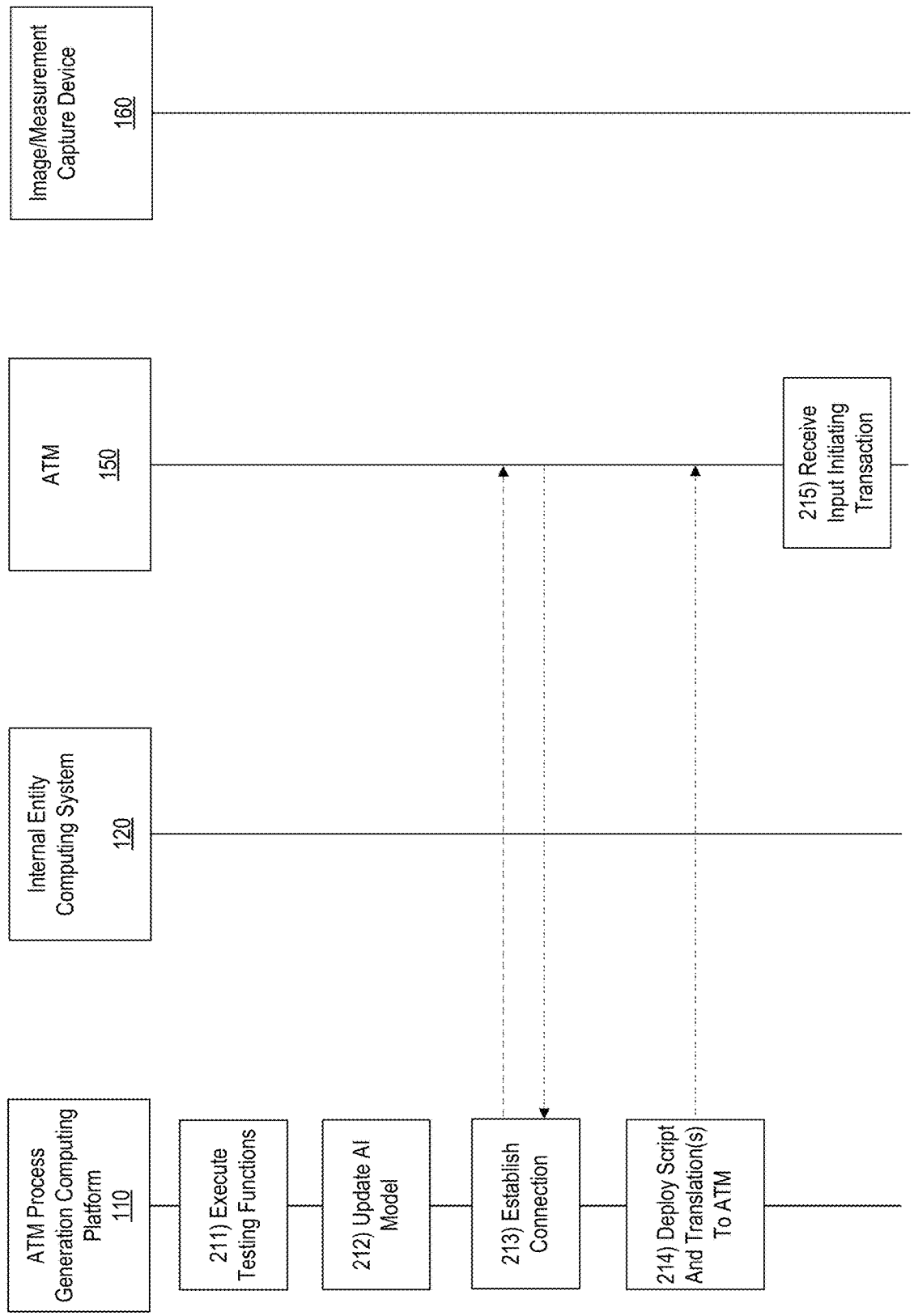

With reference to FIG. 2C, at step 211, the ATM process generation computing platform 110 may initiate one or more testing functions to ensure proper functionality of the ATM and proper descriptions in the audio scripts generated by the AI model. Accordingly, the functionality of the ATM may be tested to ensure that the audio scripts accurately identify position of components, that measurements are correct, that functionality is as expected, and the like.

At step 212, the AI model may be updated and/or validated based on the generated component mappings, audio scripts, translations and outcome of the testing performed. Accordingly, accuracy of the AI model may be continuously improved such that the validated or updated model may be used in subsequent analysis to provide even greater accuracy.

At step 213, ATM process generation computing platform 110 may establish a connection with ATM 150. For instance, ATM process generation computing platform 110 may establish a second wireless connection with ATM 150. Upon establishing the second wireless connection, a communication session may be initiated between ATM process generation computing platform 110 and ATM 150.

At step 214, the ATM process generation computing platform 110 may transmit, send or deploy the generated audio scripts and the like to the ATM.

At step 215, the ATM may receive user input requesting a transaction. For instance, user may insert a card into a card reader, may select an option on the ATM to begin a transaction, or the like.

Figure 2D:
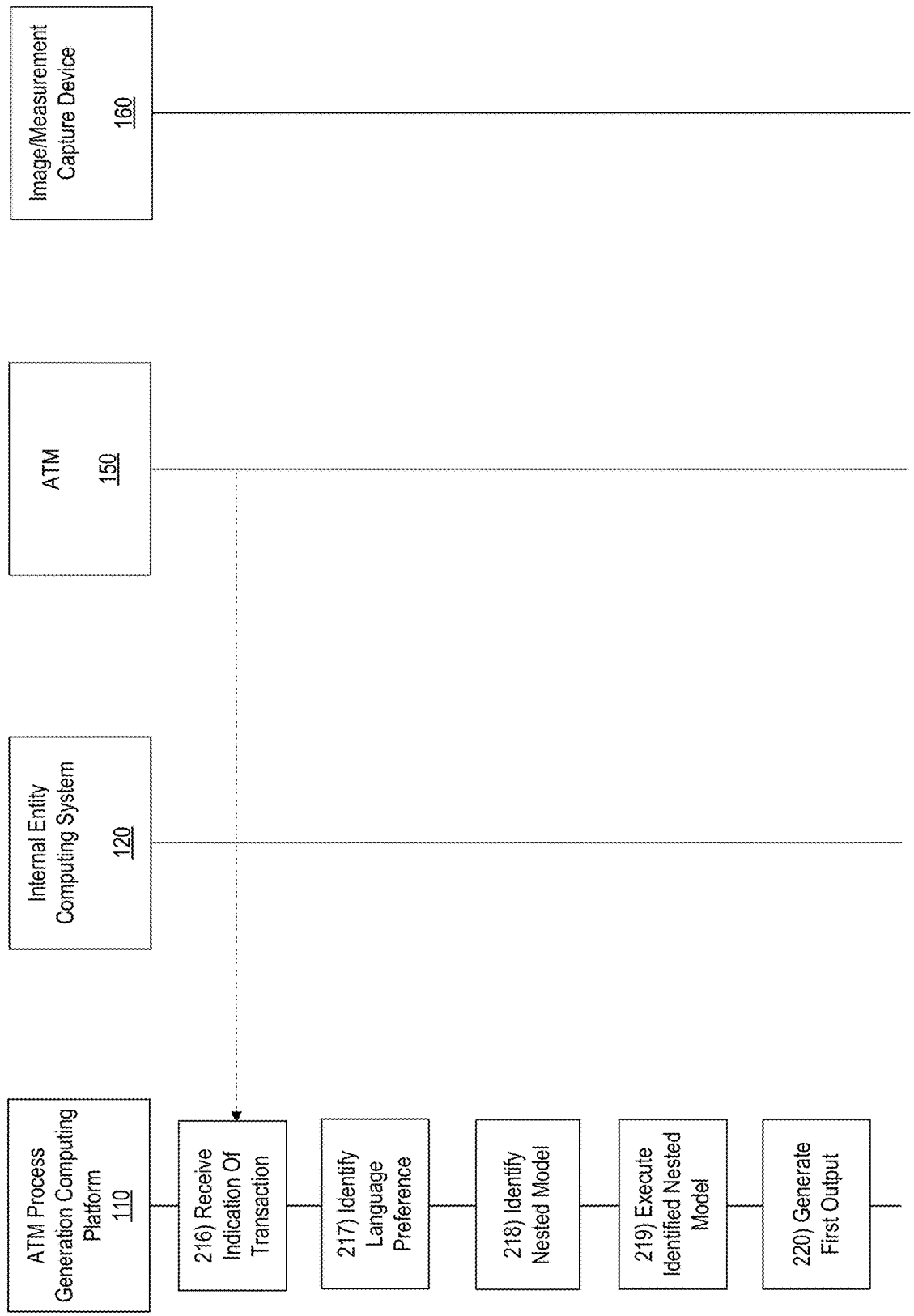

With reference to FIG. 2D, at step 216, the ATM process generation computing platform 110 may receive an indication that a user has requested a transaction at the ATM. In response, the ATM process generation computing platform 110 may initiate generative AI functions to provide service to the customer.

At 217, the ATM process generation computing platform 110 may identify a language preference associated with the user requesting the transaction at the ATM. For instance, in some examples, a language preference associated with the user may be pre-stored (e.g., based on previous interactions) and the pre-stored language preference may be retrieved.

Additionally or alternatively, a user may select a language preference from a plurality of displayed or provided (e.g., via audio) languages available for selection. In some examples, a user may select a selectable option on, for instance, a touch screen associated with a desired language. Additionally or alternatively, the user may provide spoken input to the ATM identifying a language and/or dialect for use. In some examples, the ATM may receive the spoken input, transmit the input to the ATM process generation computing platform 110 and an AI model may analyze the spoken input to identify a particular language and/or dialect for use.

At step 218, based on user input initiating a transaction, a first nested AI model may be selected from a plurality of nested AI models. For instance, if a user has selected to merely begin a transaction and has not identified a particular type of transaction, a nested model associated with a standard greeting, and the like, may be selected.

At step 219, the identified nested model may be executed using the language and/or dialect preference, as well as any additional user input, as inputs. For instance, the first nested model may be executed to analyze the selected language and any additional data.

At step 220, based on the execution of the first nested model, a first output may be generated. In some examples, the first output may include a first user interface displaying information to the user in the preferred language and/or dialect. In some examples, the first user interface may be generated by the first nested AI model and, accordingly, may be generated to accommodate variations in test, font, color, contrast, or the like, associated with the language preference, while also maintaining compliance with regulatory requirements. For instance, if a particular language requires a larger text box than other languages to accommodate a plurality of selectable options to provide to the user, the first nested AI model may generate the first user interface with the larger text area to accommodate the language preference. In some examples, the first user interface may include an animated avatar or other visualization of a person to facilitate providing service to the user of the ATM 150.

Additionally or alternatively, the first output may include first audio data. For instance, the first nested AI model may generate first audio data presenting a plurality of options to the user in the identified preferred language and/or dialect. The audio data may be provided to the user and, the user may response via audio or spoken response, user input to the ATM, or the like.

Figure 2E:
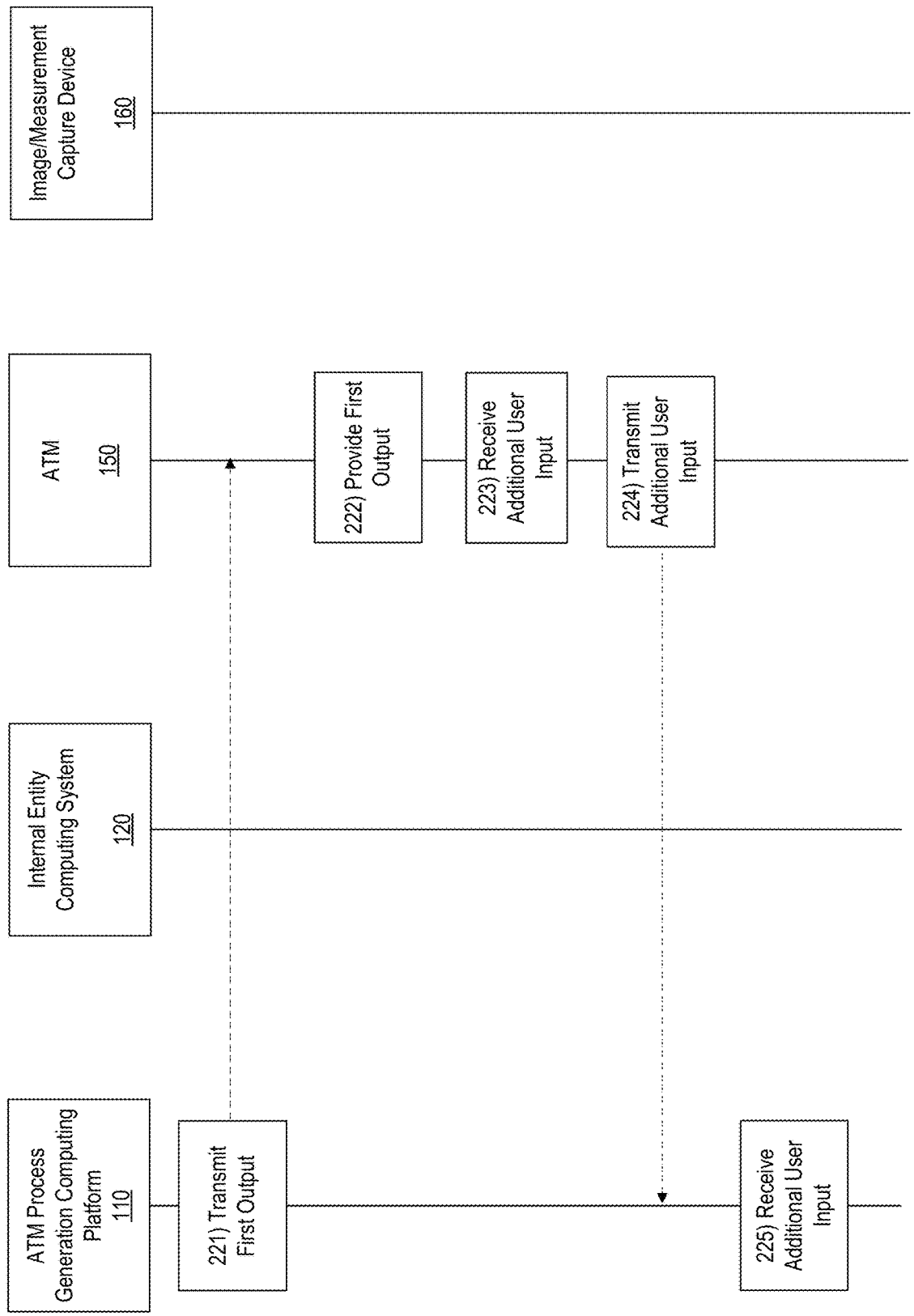

With reference to FIG. 2E, at step 221, the ATM process generation computing platform 110 may transmit or send the first output to the ATM 150. In some examples, transmitting or sending the first output to the ATM 150 may cause the ATM 150 to display the first output, provide the first output via audio output, or the like.

At step 222, the ATM 150 may receive the first output and provide the first output to the user. For instance, if the first output is a first user interface, the first user interface may be displayed by a display of the ATM 150. If the first output is audio data, the audio data may be presented to the user (e.g., via headphone connection via the headphone jack of the ATM).

At step 223, in response to the first output being provided to the user, additional user input may be received by the ATM 150 and from the first user. For instance, additional user input including selection of one or more selectable options displayed on a display of the ATM (e.g., via the first user interface) may be received. Additionally or alternatively, a user may provide spoken or audio input in response to options provided to the user. The spoke or audio input may be captured by microphone of the ATM and processed.

At step 224, the ATM 150 may transmit or send the additional user input to the ATM process generation computing platform 110.

At step 225, the ATM process generation computing platform 110 may receive the additional user input.

Figure 2F:
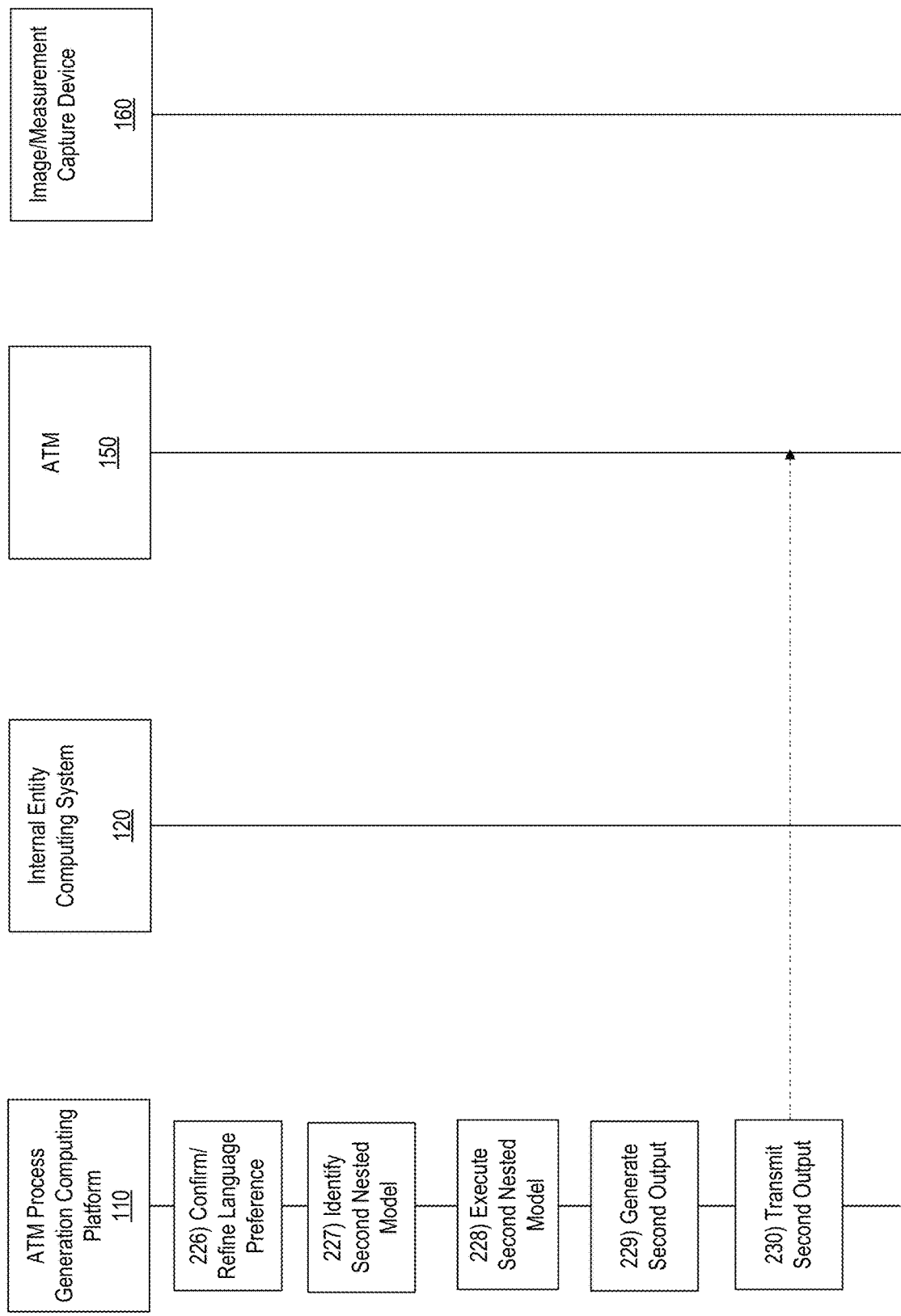

With reference to FIG. 2F, at step 226, the ATM process generation computing platform 110 may analyze the additional user input to confirm or refine the language preference. For instance, the received additional user input may be analyzed using one or more generative AI models to confirm the earlier identified language preference, refine the language preference (e.g., select a different dialect), or the like.

At step 227, the ATM process generation computing platform 110 may select or identify a second nested generative AI model based on the received additional user input. For instance, if the additional user input indicates the user desires to withdraw funds from the ATM, a nested generative AI model associated with withdrawals may be identified or selected for use.

At step 228, the second nested AI model may be executed using the confirmed or refined language preference and the additional user input as inputs to the model. For instance, the second nested model may evaluate the received additional user input to generate response data in the confirmed or refined language preference.

At step 229, the ATM process generation computing platform 110 may generate a second output from the second nested AI model. For instance, the second nested AI model may generate a second output that may include a second user interface, second audio data, or the like, in the confirmed or refined language and providing additional options or data to the user (e.g., confirmation of requested transaction, request for indication of amount of funds to withdraw, or the like).

At step 230, the ATM process generation computing platform 110 may transmit or send the second output to the ATM 150. In some examples, sending the second output to the ATM 150 may cause the ATM 150 to display the second output, provide audio data based on the second output, or the like.

Figure 2G:
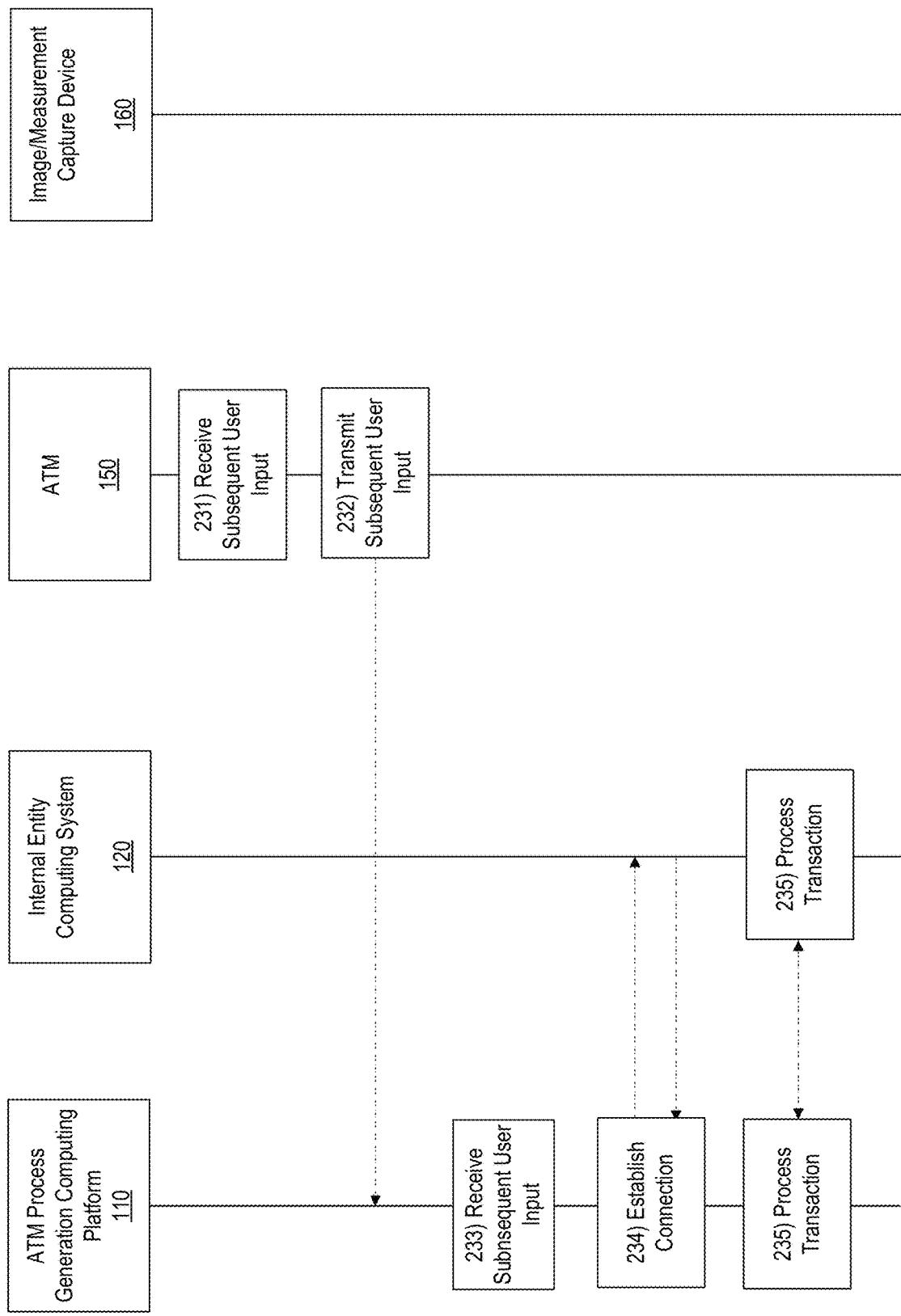
Figure 2H:
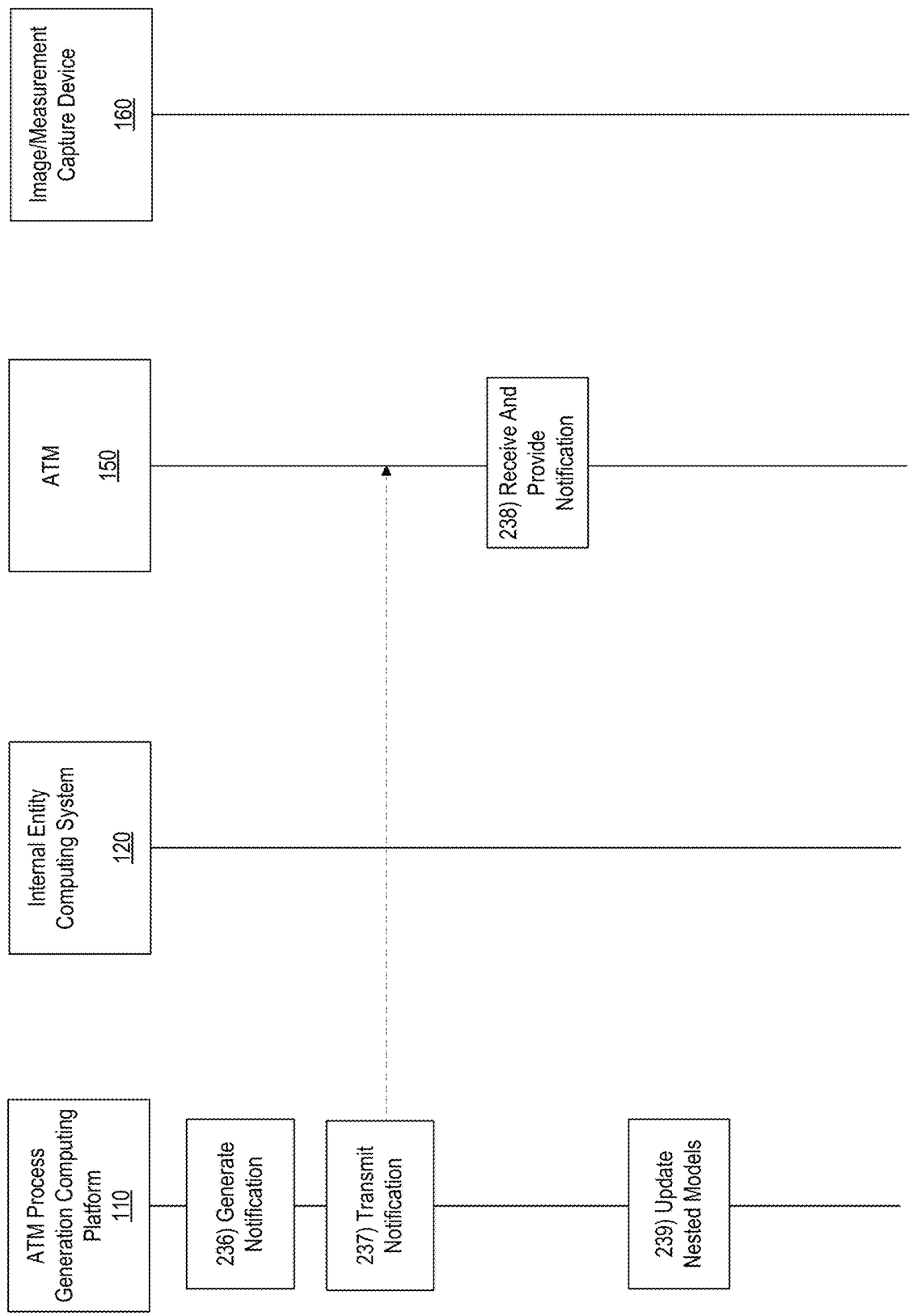

With reference to FIG. 2G, at step 231, the ATM 150 may receive subsequent user input. For instance, the user may provide user input selecting an option from the second user interface, responding with an audible selection of an option from the second audio data, or the like. In some examples, the subsequent data may include user input requiring additional nested models to be identified and executed. Alternatively, the subsequent user input may be associated with the same functionality as the second user input and, accordingly, the second nested model may be used for further analysis. Additionally or alternatively, the subsequent user input might not require additional generative AI analysis.

Accordingly, at step 232, the ATM 150 may transmit or send the subsequent user input to the ATM process generation computing platform 110. At step 233, the ATM process generation computing platform 110 may receive the subsequent user input.

At step 234, the ATM process generation computing platform 110 may, in response to the subsequent user input (which may, e.g., indicate a confirmation to proceed with processing the transaction) establish a connection with internal entity computing system 120. For instance, ATM process generation computing platform 110 may establish a third wireless connection with internal entity computing system 120. Upon establishing the third wireless connection, a communication session may be initiated between ATM process generation computing platform 110 and internal entity computing system 120.

At step 235, the ATM process generation computing platform 110 and internal entity computing system 120 may process the transaction. For instance, an account ledger associated with the user account may be updated or other backend processed may be executed to process the transaction.

With reference to FIG. 2G, at step 236, the ATM process generation computing platform 110 may generate a notification indicating that the transaction has been processed. In some examples, the notification may be generated for, for example, the second nested AI model in the confirmed/refined language. In some arrangements, the notification may include an instruction or command causing the ATM to execute a function (e.g., dispense funds, receive a deposit, provide a receipt, or the like). In some examples, the notification may include a user interface, audio data, or the like.

At step 237, the ATM process generation computing platform 110 may transmit or send the notification to the ATM 150. In some examples, transmitting or sending the notification may cause the notification to be provided to the user (e.g., displayed on a display of the ATM 150, provided via audio to the user, or the like).

At step 238, the ATM 150 may receive and provide the notification to the user (e.g., via visual display, audio, or the like).

At step 239, the one or more nested generative AI models may be updated and/or validated based on the confirmed/refined language preference, user input received, notification sent, and the like. Accordingly, rather than updating or validating a model used to generate outputs associated with all functionality of the ATM, only the nested models used to provide functionality for this particular transaction may be updated or validated. Accordingly, this may conserve computing resources while continuously improving the accuracy of the models.

Figure 3:
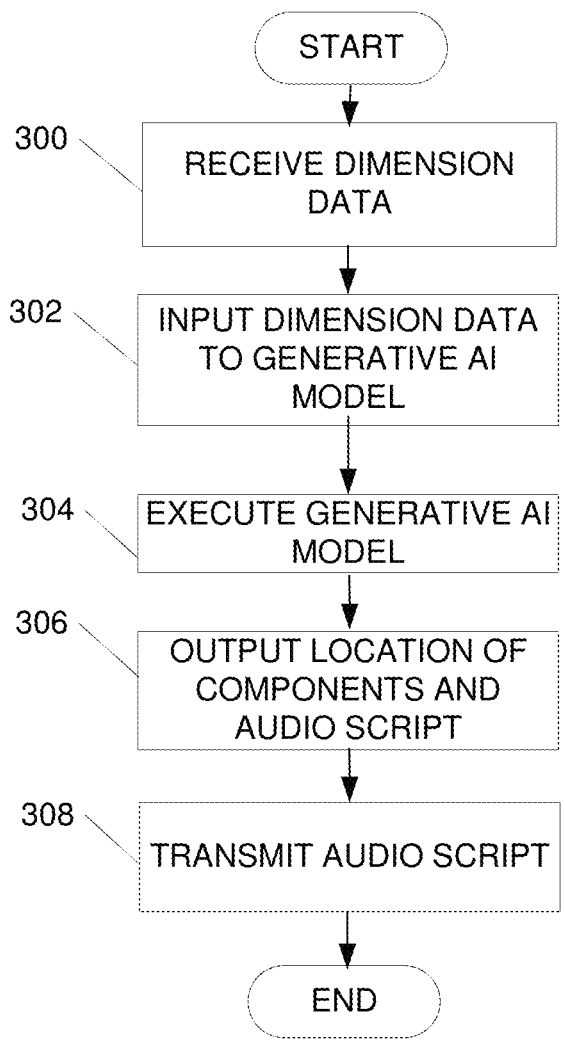
FIG. 3 depicts an illustrative method for using generative artificial intelligence models to generate ATM processes in accordance with one or more aspects described herein.

FIG. 3 is a flow chart illustrating one example method of using generative artificial intelligence to generate ATM processes and functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform, such as ATM process generation computing platform 110, may receive, dimension data associated with an ATM from one or more image or measurement capture devices. For instance, one or more image or measurement capture devices may include cameras, laser measuring tools, and the like, that may capture overall dimension data, images of a front face of the ATM, measurements associated with one or more components of the ATM, or the like.

At step 302, the dimension data may be input to a generative artificial intelligence model for analysis. In some examples, the generative artificial intelligence model may be trained using historical ATM dimension data, regulatory requirement data associated with ATM structure, size, component position, display, and the like.

At step 304, the generative artificial intelligence model may be executed and, at step 306, the generative artificial intelligence model may output, based on the inputs including the dimension data associated with the ATM, a location of each component of the plurality of components of the ATM relative to a reference point on the ATM, as well as an audio script describing the location of each component of the plurality of components of the ATM. In some examples, the components of the ATM may include at least a card reader, cash dispensing slot, deposit receiving slot, headphone jack, and the like. In some examples, the reference point may be a number 5 key on a keypad of the ATM.

In some examples, execution of the generative artificial intelligence model may further cause the generative artificial intelligence model to output an indication of compliance of the ATM, ATM structure, position or location of components, and the like, with regulatory requirements in the regulatory requirement data. Additionally or alternatively, the generative artificial intelligence model may output translations of the at least one audio script translating the at least one audio script into a plurality of languages.

At step 306, the computing platform may transmit or send the at least one audio script to the ATM for deployment or presentation to a user during a user interaction with the ATM. In some examples, transmitting or sending the at least one audio script may cause the ATM to provide audio data including the audio script in response to user insertion of a headphone connection into a headphone jack of the ATM.

In some arrangements, prior to transmitting the at least one audio script to the ATM, the computing platform may execute one or more test operations to confirm accuracy of the at least one audio script (e.g., that the location of each component is as described in the at least one audio script).

Figure 4:
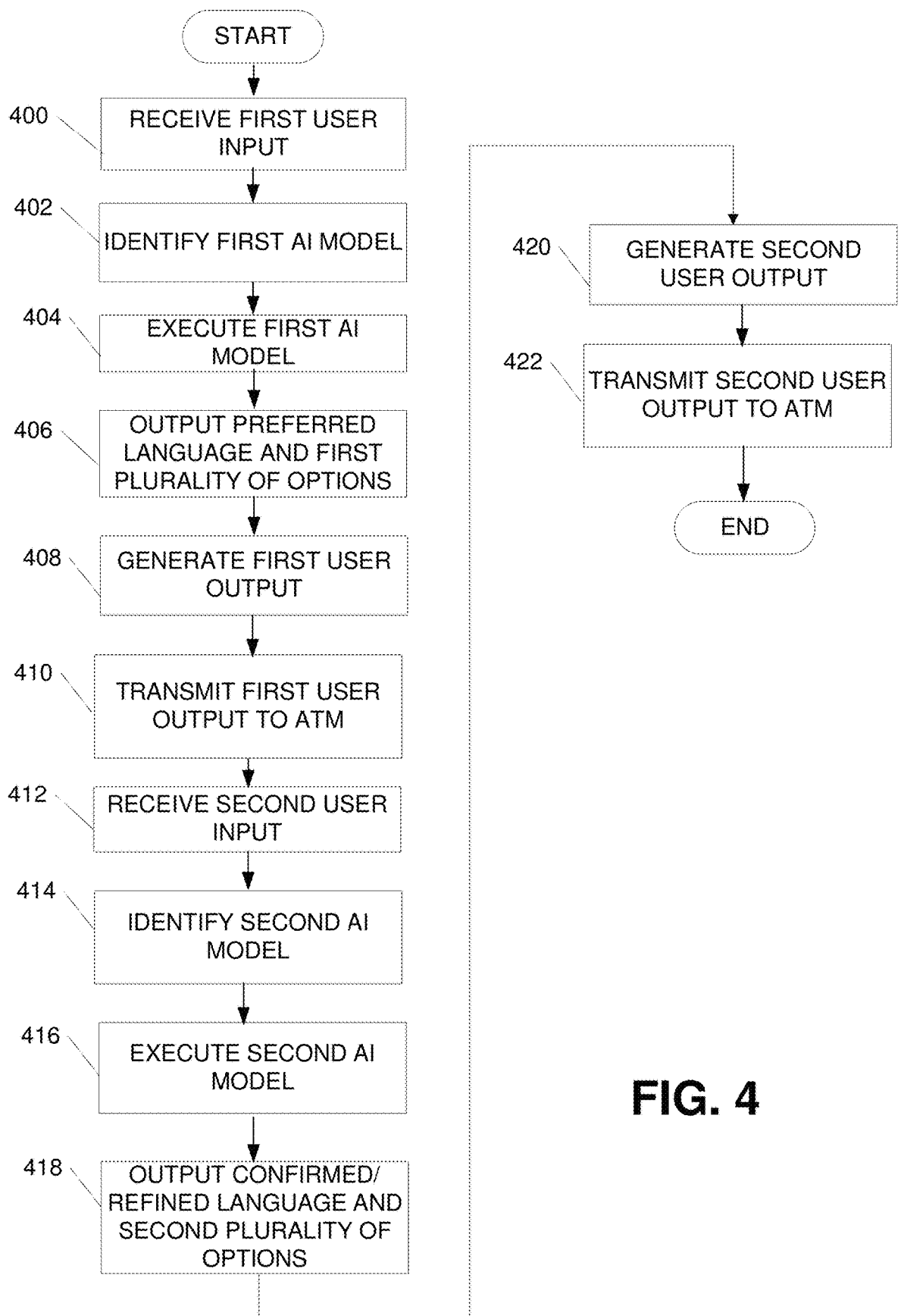
FIG. 4 depicts an illustrative method for using generative artificial intelligence models to generate ATM processes in accordance with one or more aspects described herein.

FIG. 4 is a flow chart illustrating one example method of using generative artificial intelligence to generate ATM processes and functions in accordance with one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 4 may be performed in real-time or near real-time.

At step 400, a computing platform, such as ATM process generation computing platform 110, may receive, from a user at an ATM, first user input. In some examples, the first user input may include a request to initiate a transaction.

At step 402, based on the first user input, the computing platform may identify a first generative artificial intelligence model. In some examples, the first generative artificial intelligence model may be associated with a first functionality of the ATM (e.g., a welcome functionality or generate inquiry functionality). In some arrangements, the first generative artificial intelligence model may be one of a plurality of artificial intelligence models, each model being associated with a different functionality of the ATM.

At step 404, the computing platform may execute the first generative artificial intelligence model. In some examples, executing the first generative artificial intelligence model may include inputting the first user input to the first generative artificial intelligence model to output, at step 406, a preferred language associated with the user, as well as a first plurality of selectable options in the preferred language to be provided to the user. In some examples, outputting the preferred language may include outputting a particular dialect of the first language as well.

At step 408, the computing platform may generate, based on the output preferred language and first plurality of selectable options, a first user output providing the first plurality of selectable options to the user in the preferred language. In some examples, the first user output may include a user interface displaying the first plurality of selectable options. In some examples, generating the first user interface may include dynamically generating or modifying at least one of a size of a text box or a position of a text box based on the preferred language (e.g., to accommodate variations in size of text or the like based on language).

Additionally or alternatively, the first user output may include an audio script describing the first plurality of selectable options via audio data. In some arrangements, generating the first user output may include generating the first user output in the preferred language and any identified dialect of the preferred language.

At step 410, the computing platform may transmit or send the first user output to the ATM. In some examples, transmitting or sending the first user output may cause the ATM to provide the first plurality of selectable options to the user in the preferred language (e.g., by displaying the generated first user interface, by playing the first audio script, or the like).

At step 412, the computing platform may receive, from the user at the ATM, second user input in response to the first user output. For instance, the second user input may include selection of one of the selectable options of the first plurality of selectable options provided to the user. In some examples, the second user input may include a type of transaction to perform. In some examples, the second user input may be response data (e.g., audio response data) spoken by the user and captured via a microphone of the ATM.

At step 414, the computing platform may identify, based on the second user input, a second generative artificial intelligence model. In some examples, the second generating artificial intelligence model may be associated with a second functionality of the ATM different from the first functionality. The second generative artificial intelligence model may be one of the plurality of generative artificial intelligence models.

At step 416, the computing platform may execute the second generative artificial intelligence model. In some examples, executing the second generative artificial intelligence model may include inputting the second user input to the second generative artificial intelligence model to output, at step 418, one of confirmation of the preferred language or a refined or modified preferred language, as well as a second plurality of selectable options in the one of the confirmed preferred language or the refined preferred language, to be provided to the user.

At step 420, the computing platform may generate, based on the output confirmed or refined preferred language and second plurality of selectable options, a second user output providing the second plurality of selectable options to the user in the confirmed or refined preferred language. In some examples, the second user output may include a second user interface displaying the second plurality of selectable options. In some examples, generating the second user interface may include dynamically generating or modifying at least one of a size of a text box or a position of a text box based on the confirmed or refined preferred language (e.g., to accommodate variations in size of text or the like based on language).

Additionally or alternatively, the second user output may include a second audio script describing the second plurality of selectable options via audio data, in the preferred language and any identified dialect of the preferred language.

At step 422, the computing platform may transmit or send the second user output to the ATM. In some examples, transmitting or sending the second user output may cause the ATM to provide the second plurality of selectable options to the user in the confirmed or refined preferred language (e.g., by displaying the generated second user interface, by playing the second audio script, or the like).

Figure 5:
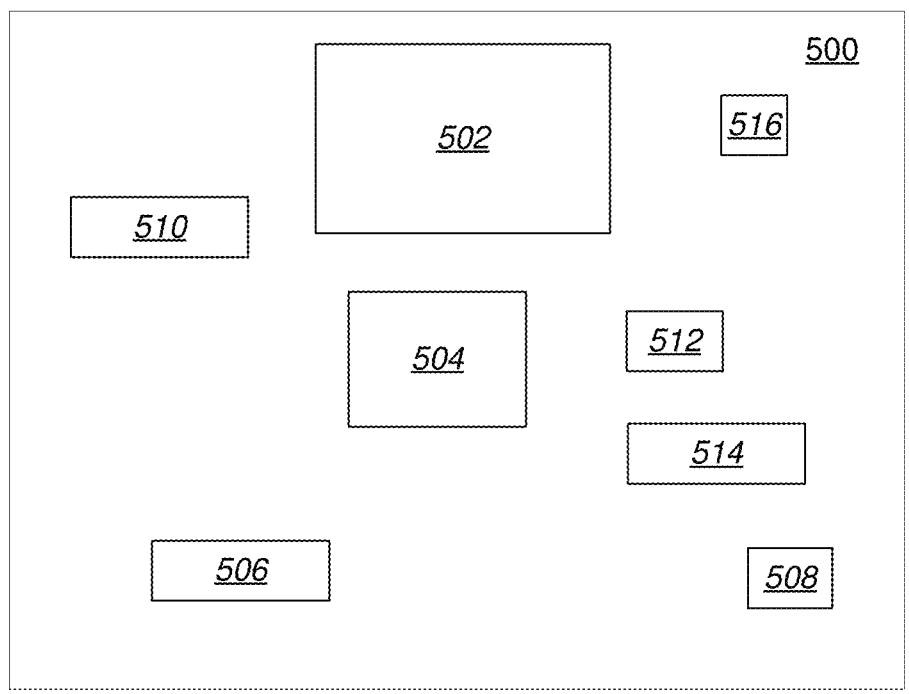
FIG. 5 illustrates a schematic view of one example ATM that may be used in accordance with one or more aspects described herein.

FIG. 5 is a schematic diagram of a front face of an ATM that may be used in accordance with one or more aspects described herein. The arrangements shown in FIG. 5 is merely one ATM arrangement and various other arrangements of components may be used without departing from the invention.

The ATM 500 shown includes a plurality of components, such as a display screen 502, keypad 504, cash dispensing slot 506, headphone jack 508, receipt dispensing slot 510, card reader 512, deposit receiving slot 514, microphone 516, and the like. As discussed herein, one or more generative artificial intelligence models may be used to analyze image or measurement data and determine a position of each component relative to a reference point. In some examples, the model may output an audio script describing the determined position of each component. For example, if the reference point is the number "5" key on the keypad 504, the model may determine a position or location of the card reader 512 to be at "3 o'clock 2 inches from the "5" key." In another example, the model may determine/describe the headphone jack to be at "5 o'clock 5 inches from the "5" key." Various other determinations of position and/or descriptions may be used without departing from the invention.

As discussed herein, aspects described relate to generative artificial intelligence models used to generate ATM processes. The arrangements described enable accurate evaluation of size, shape, position, and the like, of an overall ATM, as well as components on the face of the ATM, and enable real-time, dynamic generation of user interfaces, audio data, and the like, to facilitate customer transactions in a plurality of languages.

Further, aspects described herein generate, using generative artificial intelligence, audio scripts (e.g., spoken or audible outputs provided to a user to describe functionality of an ATM, position of components, or the like) and may also be used to confirm compliance of the ATM with regulatory requirements. For instance, regulatory requirements may relate to overall size of the ATM, position or angle of display screen, size of font or displays used, position of braille indicia on the face of the ATM, and the like. The generating AI model may be used to verify or confirm that a particular ATM meets those requirements, in addition to generating data that complies with the requirements.

In some examples, a location of deployment of the ATM (e.g., blueprints of the space, computer aided design files of the space, or the like) may also be used to evaluate the ATM to ensure it meets requirements (e.g., sufficient space for serviceability, sufficient access for users having mobility assistance devices, lighting is appropriate in the deployed location, and the like). In some examples, an ATM may be evaluated for compliance either before the ATM is deployed to the location or after it has been deployed and is in position. Accordingly, aspects described herein not only may be used to evaluate different models of ATM but also each individual ATM and its deployment location to ensure compliance with requirements.

While aspects described herein provide for AI generation of audio scripts, user interfaces, and the like, ATM and the associated audio scripts and/or user interfaces may undergo testing similar to testing performed when the audio scripts and user interfaces are manually generated. Accordingly, the testing process may ensure that the AI model is generating outputs that are in compliance and that the model is performing as expected. In some examples, testing may be performed for each language in which outputs are generated. Additionally or alternatively, a spot checking process may be used to ensure various language translations are in compliance. In some examples, testing processes may cause particular parameters of various outputs to be tested and results may be presented in tabular form to quickly determine whether the model is performing as expected, an anomaly has occurred with the model, or the like.

Although various aspects described herein are described in the context of an ATM, the arrangements described may be used with any type of self-service kiosk without departing from the invention.

Further, as discussed herein, in some aspects, the generative AI model and ATM process generation computing platform may generate outputs that may be presented to a user via an avatar or other person-like image powered by the generative AI model. The avatar may appear to hear and respond to user input, provide response data in a preferred language and/or dialect of the user, and the like. The system may also receive data from a camera associated with or located on the ATM that may capture images of user documents, or the like, for validation. The avatar may be provided via a conventional ATM to further assist in improving a customer service experience.

Although aspects described herein include identifying a particular dialect of a preferred language and providing outputs in the dialect, in some examples, the system may identify particular speech patterns, terminology, or the like, that may indicate a generation of a user, or other aspect of the particular user that may lead to use of particular terminology being used in the generated outputs (e.g., particular slang or other terms that may appeal to different users based on the input received from the user).

Arrangements described herein may also be used to generate outputs using various forms of sign language. For instance, an avatar may be generated to sign information to the user.

As discussed herein, in some examples, a preferred language of a user may be known and pre-stored. The pre-stored preferred language may be retrieved upon receiving an indication of initiation of a transaction and the language selection may be confirmed or refined through the user interaction with the ATM. Additionally or alternatively, a user may select a preferred language from a list of languages, from a spoken list of languages, or may speak directly to the ATM. The ATM may capture the spoken words of the user and may analyze the language using natural language processing, natural language understanding, or the like, to determine the preferred language.

As discussed herein, in some arrangements, a plurality of nested AI models may be used to provide various functionality at the ATM. In some examples, each nested model may be associated with a different functionality and may be trained using historical data related to the corresponding functionality (e.g., deposit functionality model may be trained using historical deposit data, or the like). A switching mechanism may be used to identify an appropriate model for execution and move between models as needed to provide the desired customer assistance.

Further, while aspects described herein are described as using generative artificial intelligence, in some examples, machine learning, artificial general intelligence, or the like, may be used without departing from the invention.

Figure 6:
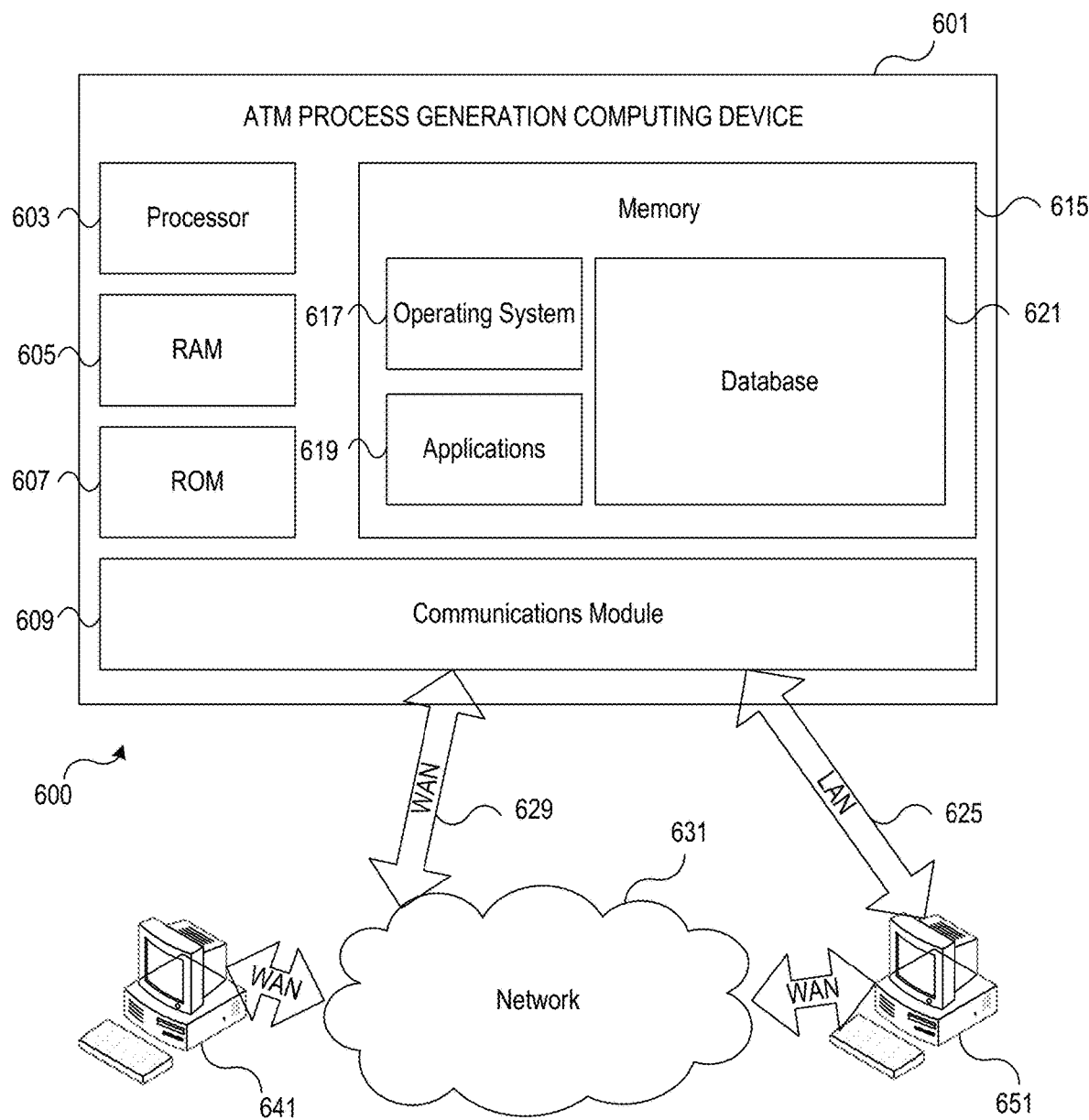
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include ATM process generation computing device 601 having processor 603 for controlling overall operation of ATM process generation computing device 601 and its associated components, including Random Access Memory (RAM) 605, Read-Only Memory (ROM) 607, communications module 609, and memory 615. ATM process generation computing device 601 may include a variety of computer readable media. Computer readable media may be any available media that may be accessed by ATM process generation computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by ATM process generation computing device 601.

Although not required, various aspects described herein may be embodied as a method, a data transfer system, or as a computer-readable medium storing computer-executable instructions. For example, a computer-readable medium storing instructions to cause a hardware processor to perform steps of a method in accordance with aspects of the disclosed embodiments is contemplated. For example, aspects of method steps disclosed herein may be executed on a processor on ATM process generation computing device 601. Such a processor may execute computer-executable instructions stored on a computer-readable medium.

Software may be stored within memory 615 and/or storage to provide instructions to processor 603 for enabling ATM process generation computing device 601 to perform various functions as discussed herein. For example, memory 615 may store software used by ATM process generation computing device 601, such as operating system 617, application programs 619, and associated database 621. Also, some or all of the computer executable instructions for ATM process generation computing device 601 may be embodied in hardware or firmware. Although not shown, RAM 605 may include one or more applications representing the application data stored in RAM 605 while ATM process generation computing device 601 is on and corresponding software applications (e.g., software tasks) are running on ATM process generation computing device 601.

Communications module 609 may include a microphone, keypad, touch screen, and/or stylus through which a user of ATM process generation computing device 601 may provide input, and may also include one or more of a speaker for providing audio output and a video display device for providing textual, audiovisual and/or graphical output. Computing system environment 600 may also include optical scanners (not shown).

ATM process generation computing device 601 may operate in a networked environment supporting connections to one or more other computing devices, such as computing device 641 and 651. Computing devices 641 and 651 may be personal computing devices or servers that include any or all of the elements described above relative to ATM process generation computing device 601.

The network connections depicted in FIG. 6 may include Local Area Network (LAN) 625 and Wide Area Network (WAN) 629, as well as other networks. When used in a LAN networking environment, ATM process generation computing device 601 may be connected to LAN 625 through a network interface or adapter in communications module 609. When used in a WAN networking environment, ATM process generation computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   train, using historical data related to at least automated teller machine (ATM) dimensions, positions of components relative to a reference point, user interfaces and audio scripts, a generative artificial intelligence model to identify correlations in subsequent data and output content based on the identified correlations, wherein the generative artificial intelligence model includes a variational encoder;
   receive, from at least one image or measurement capture device, dimension data associated with an automated teller machine (ATM) having a plurality of ATM components;
   input, to the generative artificial intelligence model, the dimension data associated with the ATM;
   execute the generated artificial intelligence model to output, based on the input dimension data associated with the ATM, a location of each ATM component of the plurality of ATM components relative to a reference point on the ATM and at least one audio script describing the location of each component of the plurality of ATM components; and
   transmit, to the ATM, the at least one audio script for presentation to a user during a user interaction with the ATM.

2. The computing platform of claim 1, wherein training the generative artificial intelligence model further includes:
   training the generative artificial intelligence model further based on regulatory requirement data associated with ATM structure.

3. The computing platform of claim 2, wherein executing the generated artificial intelligence model further includes outputting an indication of compliance of the ATM and the location of each component of the plurality of ATM components with regulatory requirements in the regulatory requirement data.

4. The computing platform of claim 1, further including instructions that, when executed, cause the computing platform to:
   further output, by the generative artificial intelligence model, translations of the at least one audio script into a plurality of languages.

5. The computing platform of claim 1, wherein transmitting, to the ATM, the at least one audio script for presentation to the user during a user interaction with the ATM causes the ATM to provide audio data including the audio script in response to user insertion of a headphone connection into a headphone jack of the ATM.

6. The computing platform of claim 1, wherein the plurality of ATM components includes at least a card reader, a cash dispensing slot, a deposit receiving slot and a headphone jack.

7. The computing platform of claim 6, wherein the reference point is a number five (5) key on a keypad of the ATM.

8. The computing platform of claim 1, further including instructions that, when executed cause the computing platform to:
   prior to transmitting, to the ATM, the at least one audio script for presentation to the user during the user interaction with the ATM, execute at least one test to confirm accuracy of the at least one audio script.

9. A method, comprising:
   training, by a computing platform, the computing platform having at least one processor and memory, and using historical data related to at least automated teller machine (ATM) dimensions, positions of components relative to a reference point, user interfaces and audio scripts, a generative artificial intelligence model to identify correlations in subsequent data and output content based on the identified correlations, wherein the generative artificial intelligence model includes a variational encoder;
   receiving, by the at least one processor and memory, and from at least one image or measurement capture device, dimension data associated with an automated teller machine (ATM) having a plurality of ATM components;
   inputting, by the at least one processor and to the generative artificial intelligence model, the dimension data associated with the ATM;
   executing, by the at least one processor, the generated artificial intelligence model to output, based on the input dimension data associated with the ATM, a location of each ATM component of the plurality of ATM components relative to a reference point on the ATM and at least one audio script describing the location of each component of the plurality of ATM components; and
   transmitting, by the at least one processor and to the ATM, the at least one audio script for presentation to a user during a user interaction with the ATM.

10. The method of claim 9, wherein training the generative artificial intelligence model further includes:
    training, by the at least one processor, the generative artificial intelligence model further based on regulatory requirement data associated with ATM structure.

11. The method of claim 10, wherein executing the generated artificial intelligence model further includes outputting an indication of compliance of the ATM and the location of each component of the plurality of ATM components with regulatory requirements in the regulatory requirement data.

12. The method of claim 9, further including:
    further outputting, by the generative artificial intelligence model, translations of the at least one audio script into a plurality of languages.

13. The method of claim 9, wherein transmitting, to the ATM, the at least one audio script for presentation to the user during a user interaction with the ATM causes the ATM to provide audio data including the audio script in response to user insertion of a headphone connection into a headphone jack of the ATM.

14. The method of claim 9, wherein the plurality of ATM components include at least a card reader, a cash dispensing slot, a deposit receiving slot and a headphone jack.

15. The method of claim 14, wherein the reference point is a number five (5) key on a keypad of the ATM.

16. The method of claim 9, further:
    prior to transmitting, to the ATM, the at least one audio script for presentation to the user during the user interaction with the ATM, executing, by the at least one processor, at least one test to confirm accuracy of the at least one audio script.

17. One or more non-transitory computer-readable media storing instructions that, when executed by a computing platform comprising at least one processor, memory, and a communication interface, cause the computing platform to:
   train, using historical data related to at least automated teller machine (ATM) dimensions, positions of components relative to a reference point, user interfaces and audio scripts, a generative artificial intelligence model to identify correlations in subsequent data and output content based on the identified correlations, wherein the generative artificial intelligence model includes a variational encoder;
   receive, from at least one image or measurement capture device, dimension data associated with an automated teller machine (ATM) having a plurality of ATM components;
   input, to the generative artificial intelligence model, the dimension data associated with the ATM;
   execute the generated artificial intelligence model to output, based on the input dimension data associated with the ATM, a location of each ATM component of the plurality of ATM components relative to a reference point on the ATM and at least one audio script describing the location of each component of the plurality of ATM components; and
   transmit, to the ATM, the at least one audio script for presentation to a user during a user interaction with the ATM.

18. The one or more non-transitory computer-readable media of claim 17, wherein training the generative artificial intelligence model further includes instructions that, when executed, cause the computing platform to:
   train the generative artificial intelligence model further based on regulatory requirement data associated with ATM structure.

19. The one or more non-transitory computer-readable media of claim 18, wherein executing the generated artificial intelligence model further includes outputting an indication of compliance of the ATM and the location of each component of the plurality of ATM components with regulatory requirements in the regulatory requirement data.

20. The one or more non-transitory computer-readable media of claim 17, further including instructions that, when executed, cause the computing platform to:
   further output, by the generative artificial intelligence model, translations of the at least one audio script into a plurality of languages.

* * * * *